United States Patent [19]

Barefoot

[11] Patent Number: 5,106,169
[45] Date of Patent: Apr. 21, 1992

[54] ADAPTER FOR INTERCONNECTING EMPTY/LOAD VALVE WITH STORAGE CANISTER

[75] Inventor: Richard Barefoot, Milford, Pa.

[73] Assignee: Eilcon National, Inc., Greenville, S.C.

[21] Appl. No.: 652,576

[22] Filed: Feb. 8, 1991

[51] Int. Cl.$^5$ .............................................. B60T 8/18
[52] U.S. Cl. ................................. 303/22.7; 137/884; 137/271
[58] Field of Search ............. 303/22.2, 22.7, 22.8; 137/884 X, 269, 271; 285/12, 137.1

[56] References Cited

U.S. PATENT DOCUMENTS

| | | | |
|---|---|---|---|
| 3,756,274 | 9/1973 | Wolfgramm | 137/271 |
| 3,934,605 | 1/1976 | Legris | 137/271 |
| 4,183,373 | 1/1980 | Kay | 137/271 |

Primary Examiner—Joseph F. Peters, Jr.
Assistant Examiner—Anne E. Bidwell
Attorney, Agent, or Firm—Brooks Haidt Haffner & Delahunty

[57] ABSTRACT

An adapter for interconnecting the air ports of an empty/load valve which are arranged in one pattern with a component of empty/load braking apparatus having its air ports arranged in a different pattern so that an empty/load valve of an initially installed type can be replaced by an empty/load valve of a different type without removing the installed component. The adapter has ports at one face which align with the ports of the different empty/load valve and ports at another face which align with the ports of the component and channels intermediate the adapter faces which interconnect the ports at the faces of the adapter for fluid flow.

13 Claims, 3 Drawing Sheets

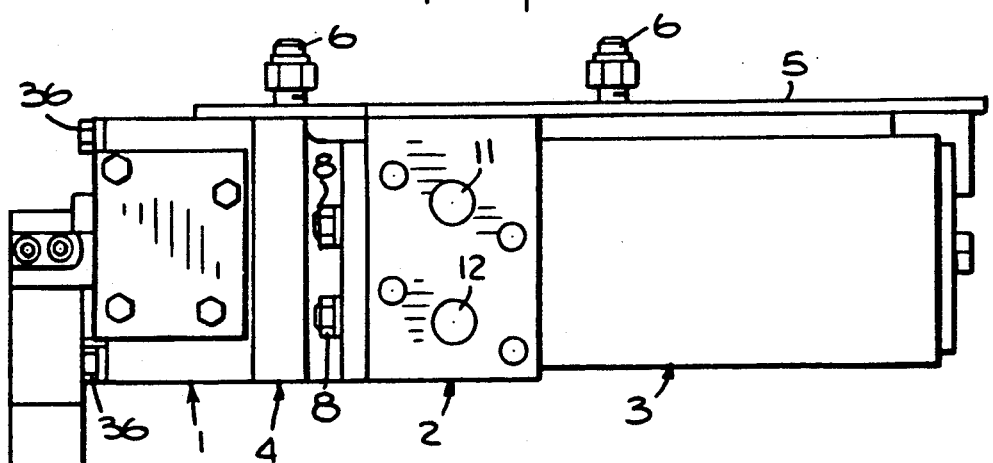
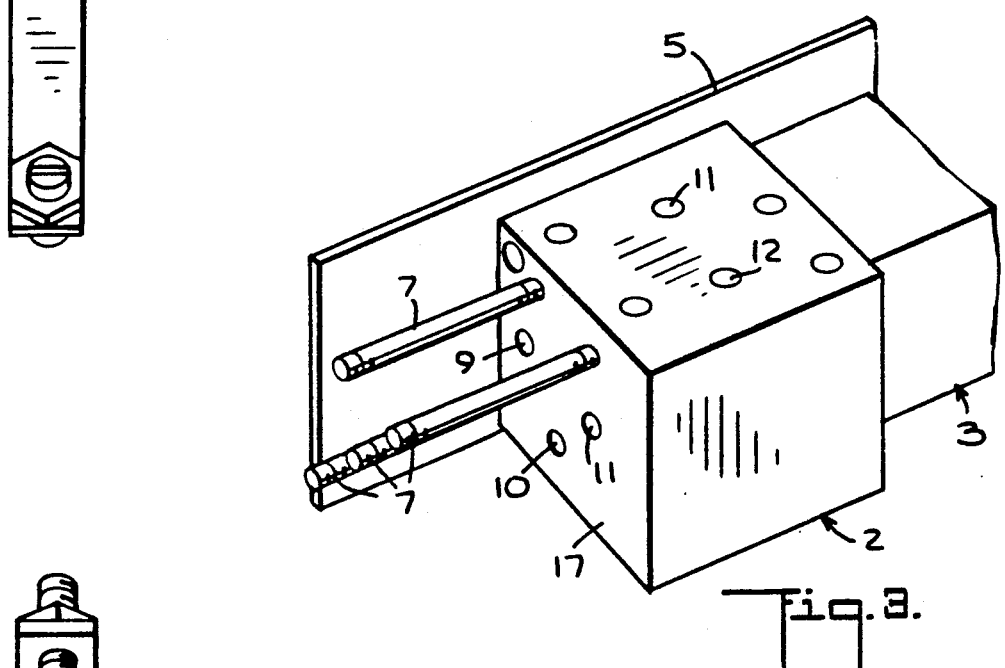
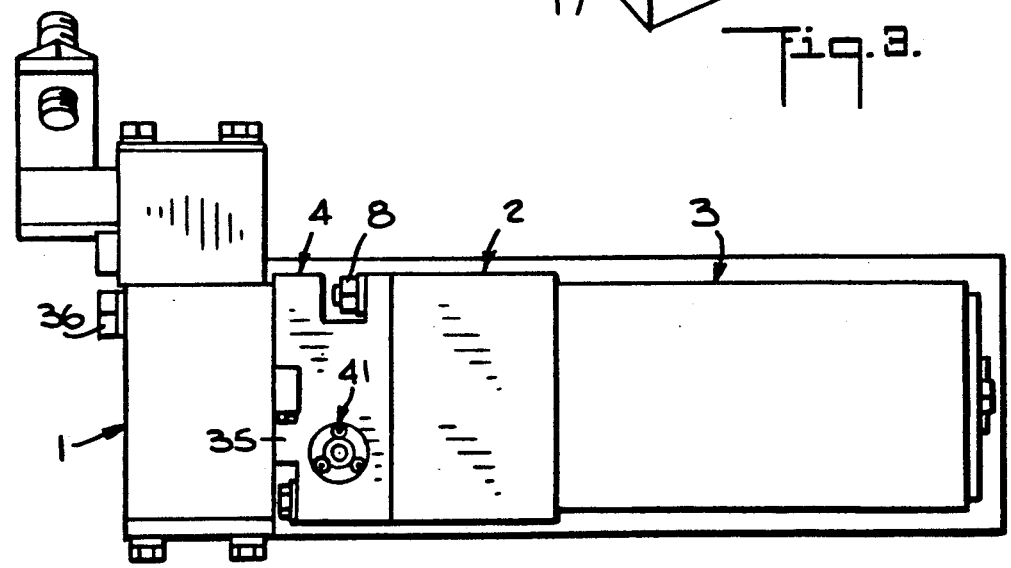

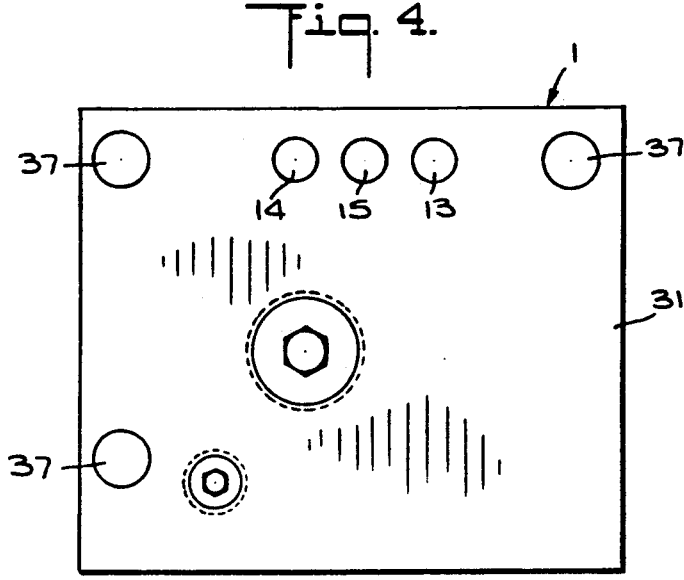
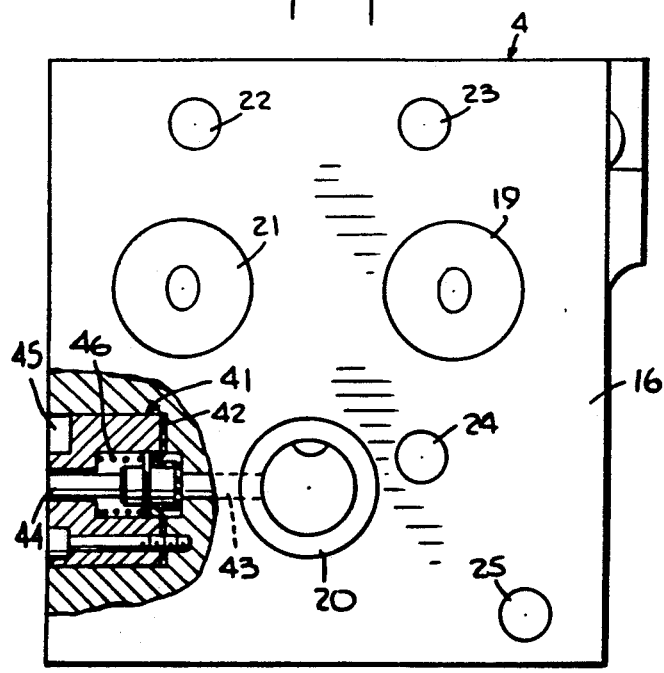
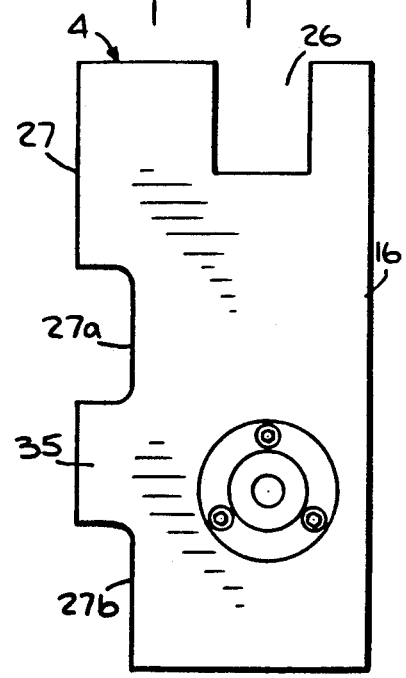

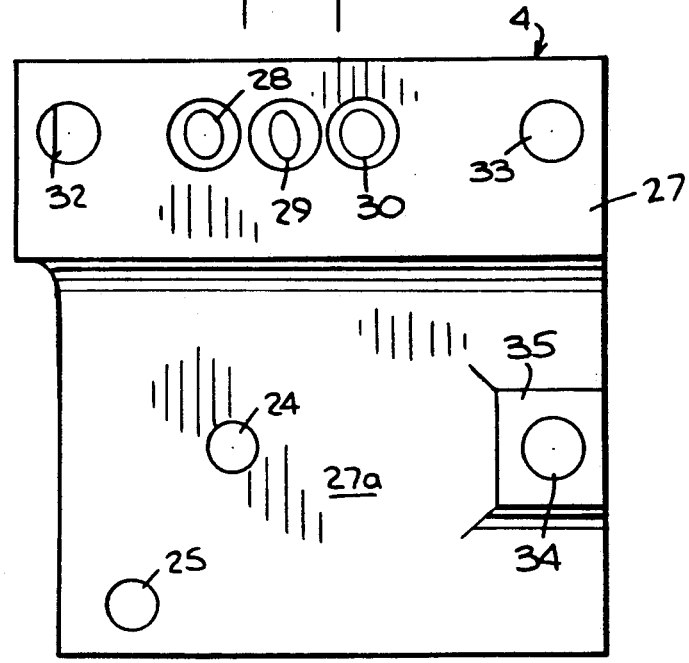
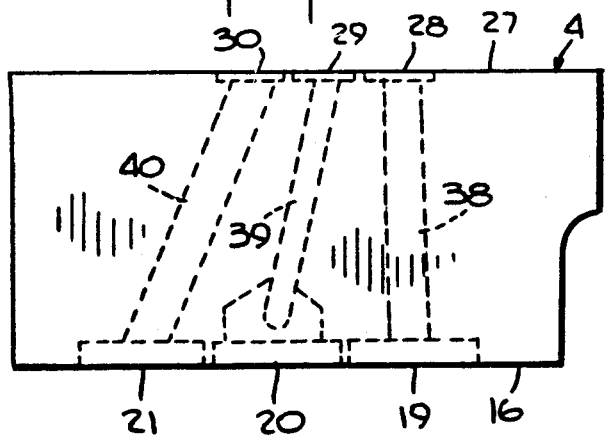
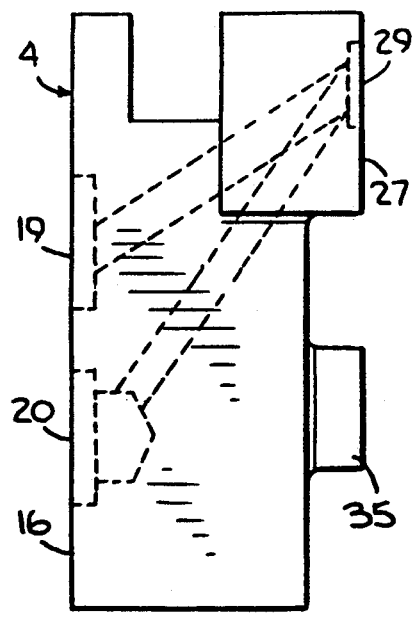

ADAPTER FOR INTERCONNECTING EMPTY/LOAD VALVE WITH STORAGE CANISTER

RELATED APPLICATIONS

This invention relates to an adapter which permits empty/load valves of the type shown in application Ser. No. 07/452,279 filed Dec. 15, 1989 and entitled Empty/Load Braking System for Railroad Cars and Valve Therefor to be used to replace other empty/load valves without removing other previously installed parts, such as the air canister.

FIELD OF THE INVENTION

This invention relates to an adapter for use in replacing empty/load valves used to control the braking pressure on vehicles, such as railway cars, by empty/load valves having air ports which are located differently from those of the valves being replaced without having to remove equipment normally associated with the valves being replaced, such as the air canister. Preferably, the adapter includes an indicator for indicating the presence or absence of air under pressure above atmospheric pressure in the air canister.

BACKGROUND OF THE INVENTION

Empty/load valves are well known in the art. See, for example, U.S. Pat. Nos. 1,615,366; 4,648,661; 4,775,197 and 4,826,259. In general, such valves include a measuring arm responsive to movement of a part of the vehicle movable toward the wheels of the vehicle with load on the vehicle and valves controlled by the measuring arm for diverting air to a storage tank or canister when the load on the vehicle is light, e.g. the vehicle is empty or only lightly loaded.

In some of the present installations, the canister is welded to the car body whereas the measuring arm is on, and the valves it controls are in, a valve body which is secured to the canister by bolts or studs with nuts. Therefore, the valve body can be removed relatively easily, but removal of the canister is difficult and expensive and may require repairs of the supporting member after removal of the canister.

The canister used with an empty/load valve of one manufacturer usually is satisfactory with respect to some of its characteristics, e.g. volume, number of air ports and placement, for use with the empty/load valve of another manufacturer. However, the placement of air ports of the canister and the attaching parts of a canister manufactured by one manufacturer usually does not permit mere replacement of the empty/load valve of one manufacturer by the empty/load valve of another manufacturer. On the other hand, there is a need to be able to replace one valve by another of a different construction, e.g. when an improved valve is developed or the valve to be replaced has been found to be unsatisfactory for various reasons.

Accordingly, there is a need for a simple and inexpensive way of replacing an installed empty/load valve body of one structure with an empty/load valve of a different structure without removing the canister.

Furthermore, for the reasons set forth hereinafter, it has been found useful in the field to be able to determine visually, after the empty/load valve is installed, whether or not the canister contains air under pressure. Many canisters already installed do not have an indicator thereon for such purpose.

BRIEF SUMMARY OF THE INVENTION

It is an object of the invention to provide an adapter which will permit the connection of an empty/load valve of one type of construction to a canister designed to receive an empty/load valve of a different type of construction without removal of the canister from the car body.

Preferably, the adapter includes a visual indicator for indicating the air pressure in the canister, when the canister does not already have such an indicator, without modifying the canister.

In accordance with the invention, the adapter is a rigid body having holes therethrough for receiving the devices on the canister for securing the valve to the canister, air ports at one face of the body which mate with the corresponding air ports in the canister, air ports at the opposite face of the adapter which mate with the corresponding air ports of the replacement valve and ducts or channels in the body which interconnect the respective air ports at one face with the corresponding air ports at the opposite face.

Preferably, the adapter body has a pin and a diaphragm therein for moving the pin, and the face of the diaphragm opposite from the face engaging the pin is interconnected by a duct or channel with the duct or channel in the body which contains air under pressure corresponding to the air under pressure in the canister so that the pin will extend from the adapter body when the canister contains air under pressure.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIGS. 1 and 2 are, respectively, plan and side views of an empty/load valve mounted on a canister unit designed to receive a different valve by the adapter of the invention;

FIG. 3 is an enlarged perspective view of the canister unit shown in FIGS. 1 and 2;

FIG. 4 is an enlarged face view of the valve shown in FIGS. 1 and 2 with the measuring arm and securing bolts removed, such face being the face which abuts the adapter;

FIG. 5 is an enlarged face view, partly in section, of the face of the adapter which abuts the canister unit;

FIG. 6 is a side view of the adapter shown in FIG. 5;

FIG. 7 is an enlarged side view of the face of the adapter which abuts the empty/load valve; and FIGS. 8 and 9 are top and side views, respectively, of the adapter shown in FIGS. 5-7 which illustrate in dash lines the channels or ducts in the adapter.

DETAILED DESCRIPTION OF PREFERRED EMBODIMENTS

Although the adapter of the invention is suitable for use in connecting empty/load valves of other types to braking system components, such as an air canister or reservoir, or components of other types, the adapter of the invention will be described in the form that has and is used for the interconnection of an empty/load valve of the type illustrated and described in said application Ser. No. 452,279 to a manifold and reservoir of the type illustrated and described in said U.S. Pat. No. 4,648,661.

FIGS. 1 and 2 are, respectively, plan and side views of an empty/load valve 1 of said application Ser. No. 452,279 interconnected with a manifold 2 and reservoir or canister 3 of the type shown in said U.S. Pat. No. 4,648,661 by the adapter 4 of the invention. As indicated in FIG. 3 of said patent, the manifold 2 and the reservoir or canister 3 are normally welded to a plate 5 which is welded to support plates (not shown herein but 34 and 36 in said patent) even though the plate 5 may be initially secured to another plate by the bolts 6. Thus, to remove the manifold 2 and the canister 3, it is necessary to break or undo several welds which is undesirable and relatively expensive.

However, even though it may be necessary to replace the empty/load valve which is secured to the manifold 2, such as by the studs 7 (see FIG. 3) with nuts 8 (see FIGS. 1 and 2), the manifold 2 and the canister 3 can be used with an empty/load valve 1 of a type different from the valve shown in said patent, and it is a relatively simple matter to remove the valve to be replaced by merely removing nuts holding the valve to be replaced against the manifold 2.

On the other hand, empty/load valves of different manufacture have air ports located in positions different from the air ports 9, 10 and 11 (see FIG. 3) of the manifold 2, sometimes deliberately so to prevent substitution of valves.

The manifold 2 has an air inlet port 11 for air supplied by the car control valve and an air outlet port 12 connected to a brake cylinder. Air to the empty/load valve is supplied through the port 9. When a car is lightly loaded, air is supplied to the canister 3 through the port 10. Air from the empty/load valve is supplied to the port 12 by way of the port 11. The ports 9, 10 and 11 are disposed substantially at the apices of an equilateral triangle.

However, although the valve described in said application Ser. No. 452,279 has an air inlet port 13 (see FIG. 4), an air outlet port 14 and a port 15 for supplying air to the canister 3, the ports 13-15 are disposed along a rectilinear line and are disposed differently from the ports 9-11. Accordingly, the empty/load valve 1 cannot be directly connected to manifold 2 because the ports 13-15 would not align with the ports 9-11, and hence, the valve 1 cannot be substituted for the valve of said U.S. Pat. No. 4,648,661 without more.

Therefore, in accordance with the invention, a rigid adapter body 4, e.g. made of steel, is provided for interconnection for fluid flow, the ports 13-15 with the corresponding ports 9-11. The adapter 4 is shown in greater detail in FIGS. 5-9.

FIG. 5 shows the adapter face 16 which is engageable with the face 17 (FIG. 3) of the manifold 2. The face 16 has three ports 19, 20 and 21 which, respectively, align with the ports 9, 10 and 11 of the manifold 2 when the face 16 engages the face 17. The adapter 4 also has four openings 22, 23, 24 and 25 for permitting the passage of the studs 7 extending from the face 17 of the manifold 2.

The adapter 4 has a a recess 26 (FIG. 6) extending transversely to the direction between the face 16 and the opposite face 27 for receiving the ends of the studs 7 passing through the openings 22 and 23 and permitting the application of the nuts 8 (FIGS. 1 and 2) to the ends of the studs 7. The adapter 4 also has a surface 27a set back from the face 27 for similar purposes for the studs 7 which pass through the openings 24 and 25. Thus, the adapter 4 can be secured to the manifold 2 by the studs 7 and the nuts 8. Normally, circular resilient rings of rectangular cross-section will be interposed between the respective ports to provide fluid tight seals.

The opposite adapter face 27 which engages the empty/load valve 1 is shown in FIG. 7 and has three ports 28, 29 and 30 which, respectively, align with the empty/load valve ports 13, 15 and 14 when the adapter face 27 engages the empty/load valve face 31 (FIG. 4). Circular resilient rings of rectangular cross section can also be interposed between the ports 28-30 and the ports 13-15 to provide fluid tight seals.

The adapter 4 has threaded holes 32, 33 and 34, the latter hole being in a boss 35, for receiving threaded bolts 36, which pass through openings 37 (FIG. 4) in the empty/load valve 1, for securing the valve 1 to the adapter 4.

As indicated in FIGS. 8 and 9, the ports 28-30 are connected for fluid flow with the corresponding ports 19-21 by channels or ducts 38, 39 and 40 provided in the body of the adapter 4.

In the field, it is desirable to be able to determine whether or not the empty/load valve 4 is operating properly. Thus, if a car is lightly loaded when the brakes are applied, air should be diverted to the canister 3, and therefore, there will be air under pressure in the channel 39. Conversely, when the car is heavily loaded and the brakes are applied, the air in the channel 39 will be substantially at atmospheric pressure. Many of the empty/load braking systems in the field and even many being initially installed do not have any means for indicating the air pressure in the canister 3.

Although it is not an essential feature of the invention, the adapter 4 can include an air pressure indicator 41 (FIGS. 2 and 5) which will indicate the pressure of the air the channel 39 and hence, in the canister 3. Although other indicators can be used, it is merely necessary to indicate high or low air pressure, and not the absolute value of the pressure, and therefore, the simple and inexpensive indicator 41 shown in FIG. 5 can be used.

The indicator 41, received in a recess 45 in the body of the adapter 4, comprises a diaphragm 42 which is exposed at one side to the fluid in the channel 39 by way of a duct or channel 43. A rod or pin 44 which, when the pressure in the channel 39 is low, does not extend above the surface of the adapter 4, engages the diaphragm 42 and is pressed thereagainst by a spring 46 which permits the rod to extend outwardly of the surface of the adapter 4 when the car is lightly loaded and there is air of the proper pressure in the channel 39 and hence, the canister 3.

In the field, the brakes of the car can be applied with the car lightly loaded. If the empty/load valve 1 is working properly, the rod 44 will extend from the adapter 4. Thereafter, air is exhausted from the canister 3, the car is loaded and the brakes are again applied. If the rod 44 again extends from the adapter 4, this indicates that the empty/load valve 1 is not working properly. However, if, in the latter case, the rod 44 does not extend from the adapter 4, it is considered that the valve 1 is working properly.

Although preferred embodiments of the present invention have been described and illustrated, it will be apparent to those skilled in the art that various modifications may be made without departing from the principles of the invention.

I claim:

1. An adapter for interconnecting a component of an empty/load braking system having fluid ports on a face in predetermined locations with an empty/load valve having corresponding ports on a face but having at least one of its ports disposed so that it does not align with a corresponding port on said component when said face of said empty/load valve engages said face of said component, said adapter comprising:

a rigid body having a pair of opposite adapter faces facing in opposite directions, one of said adapter faces having ports disposed in the predetermined locations of the ports in the component and the other of the adapter faces having ports disposed in correspondence with the ports in the face of the empty/load valve and hence, with at least one of said ports on said other adapter face disposed differently from a said port on said one adapter face; and said body having a plurality of fluid channels therein, each channel extending from one of the ports on said one of said adapter faces to the corresponding one of the ports on said other of said adapter faces and permitting the free flow of fluid from the ports on one of said adapter faces to the corresponding ports on the other of said adapter faces;

wherein when the face of the empty/load valve engages said one adapter face and the face of the component engages said other adapter face fluid is permitted to flow between corresponding ports on the empty/load valve and on the component.

2. An adapter as set forth in claim 1 wherein there are three ports on said other of said adapter faces with their centers disposed along a rectilinear line and there are three ports on said one of said adapter faces with their centers out of alignment with the centers of said ports on said other of said adapter faces.

3. Empty/load valve braking apparatus comprising:

an empty/load valve having a plurality of ports at one face thereof;

a component including a canister, said component having a plurality of ports at one face thereof corresponding in number to the number of ports at said one face of said empty/load valve but disposed differently from said ports at said one face of said empty/load valve;

a rigid adapter body intermediate said one face of said empty/load valve and said one face of said component, said adapter body having a first face in engagement with said one face of said empty/load valve and having ports at said first face aligned with said ports of said one face of said empty/load valve, said adapter body having a second face in engagement with said one face of said component and having ports at said second face aligned with said ports of said one face of said component and said adapter body having channels therein interconnecting, for fluid flow, said ports at said first face with respective ports at said second face; and releasable securing means for securing said empty/load valve and said component to said adapter.

4. Empty/load braking apparatus as set forth in claim 3 wherein said securing means comprises threaded studs extending from said component and threaded bolts, said adapter body having openings for receiving said studs and having threaded holes for receiving said bolts.

5. Empty/load braking apparatus as set forth in claim 3 wherein said empty/load valve has three ports, said canister is secured to a manifold and said adapter body is secured to said manifold, said manifold providing said one face of said component and wherein said three ports at said one face of said empty/load valve have their centers disposed along a rectilinear line and at least one of said ports at said second face of said adapter body is disposed with its center out of alignment with the centers of said ports on said first face of said adapter body.

6. Empty/load braking apparatus as set forth in claim 3 further comprising pressure responsive means on said body exposed to the fluid in one of said channels for indicating the fluid pressure in said one of said channels.

7. Empty/load braking apparatus as set forth in claim 6 wherein said pressure responsive means comprises a diaphragm having one side thereof exposed to the fluid in said one of said channels and an indicator member engaging the opposite side of said diaphragm.

8. Empty/load braking apparatus as set forth in claim 7 wherein said body has a recess and said indicator member is a rod in said recess, said rod being extendable from said recess by said diaphragm with a predetermined fluid pressure in said one of said channels.

9. An adapter for interconnecting a component of an empty/load braking system having fluid ports on a face in predetermined locations wtih an empty/load valve having corresponding ports on a face but having at least one of its ports disposed so that it does not align with a corresponding port on said component when said face of said empty/load valve engages said face of said component, said component having securing means thereon for securing it to an empty/load valve and said empty/load valve having securing means for securing it to a component, the last-mentioned securing means being located differently from the first-mentioned securing means, said adapter comprising:

a rigid body having a pair of opposite adapter faces, one of said adapter faces having ports disposed in the predetermined locations of the ports in the component and the other of the adapter faces having ports disposed in correspondence wtih the ports in the face of the empty/load valve and hence, with at least one of said ports on said other adapter face disposed differently from a said port on said one adapter face;

said body having a plurality of fluid channels therein, each channel extending from one of the ports on said one of said adapter faces to the corresponding one of the ports on said other of said adapter faces;

said body having openings for receiving said securing means of both the empty/load valve and the component;

whereby when the face of the empty/load valve engages said one adapter face and the face of the component engages said other adapter face fluid is permitted to flow between corresponding ports on the empty/load valve and on the component.

10. An adapter as set forth in claim 9 wherein said adapter has at least one recess therein extending transversely to the direction from said one adapter face to said other adapter face and wherein said openings for receiving the securing means of said component extend from said one face to said recess, said recess providing access to securing means of the component.

11. An adapter for interconnecting a component of an empty/load braking system having fluid ports on a face in predetermined locations with an empty/load valve having corresponding ports on a face but having at least one of its ports disposed so that it does not align with a corresponding port on said component when said face of said empty/load valve engages said face of said component, said adapter comprising:

a rigid body having a pair of opposite adapter faces, one of said adapter faces having ports disposed in the predetermined locations of the ports in the component and the other of the adapter faces having ports disposed in correspondence wtih the ports in the face of the empty/load valve and hence, with at least one of said ports on said other adapter face disposed differently from a said port on said one adapter face;

said body having a plurality of fluid channels therein, each channel extending from one of the ports on said one of said adapter faces to the corresponding one of the ports on said other of said adapter faces; and a pressure responsive means on said body exposed to the fluid in one of said channels for indicating the fluid pressure in said one of said channels;

whereby when the face of the empty/load valve engages said one adapter face and the face of the component engages said other adapter face fluid is permitted to flow between corresponding ports on the empty/load valve and on the component.

12. An adapter as set forth in claim 11 wherein said pressure responsive means comprises a diaphragm having one side thereof exposed to the fluid in said one of said channels and an indicator member engaging the opposite side of said diaphragm.

13. An adapter as set forth in claim 12 wherein said body has a recess and said indicator member is a rod in said recess, said rod being extendable from said recess by said diaphragm with a predetermined fluid pressure in said one of said channels.

* * * * *